United States Patent
Laktineh

(10) Patent No.: US 11,287,397 B2
(45) Date of Patent: Mar. 29, 2022

(54) GASEOUS DETECTOR OF ELEMENTARY PARTICLES

(71) Applicants: UNIVERSITÉ CLAUDE BERNARD LYON 1, Villeurbanne (FR); CENTRE NATIONAL DE LA RECHERCHE SCIENTIFIQUE, Paris (FR)

(72) Inventor: Imad Laktineh, Thil (FR)

(73) Assignees: Université Claude Bernard Lyon 1, Villeurbanne (FR); Centre National De La Recherche Scientifique, Paris (FR)

(*) Notice: Subject to any disclaimer, the term of this patent is extended or adjusted under 35 U.S.C. 154(b) by 390 days.

(21) Appl. No.: 16/485,273

(22) PCT Filed: Feb. 13, 2018

(86) PCT No.: PCT/EP2018/053561
§ 371 (c)(1),
(2) Date: Aug. 12, 2019

(87) PCT Pub. No.: WO2018/149827
PCT Pub. Date: Aug. 23, 2018

(65) Prior Publication Data
US 2021/0333236 A1    Oct. 28, 2021

(30) Foreign Application Priority Data
Feb. 15, 2017 (FR) .................................. 1751215

(51) Int. Cl.
*G01N 27/66* (2006.01)
*H01J 47/02* (2006.01)

(52) U.S. Cl.
CPC .............. *G01N 27/66* (2013.01); *H01J 47/02* (2013.01)

(58) Field of Classification Search
CPC ................................. G01N 27/66; H01J 47/02
(Continued)

(56) References Cited

U.S. PATENT DOCUMENTS

| 6,011,265 A | 1/2000 | Sauli | |
| 8,264,342 B2* | 9/2012 | Blair | H01Q 5/00 340/539.12 |

(Continued)

FOREIGN PATENT DOCUMENTS

| EP | 0948803 | 11/2006 |
| EP | 2562563 | 2/2013 |

(Continued)

OTHER PUBLICATIONS

Bidault, J. M., et al. "A Novel UV photon detector with resistive electrodes." Nuclear Physics B-Proceedings Supplements 158 (2006): 199-203. (Year: 2006).*

(Continued)

*Primary Examiner* — Christopher P McAndrew
(74) *Attorney, Agent, or Firm* — Occhiuti & Rohlicek LLP

(57) ABSTRACT

This gaseous elementary-particle detector is equipped with a readout plate comprising:
  conductive tiles (80) that are all identical to one another and all located at the same distance from an exterior face (39), these conductive tiles being distributed over the front face of a dielectric layer (72) and being mechanically separated from one another by a dielectric material (76), the smallest dimension of each tile being larger than 300 μm, and
  electrical connections (88), which are located under the dielectric layer (72) and which electrically connect the conductive tiles in series so as to form conductive strips, these electrical connections being arranged so that each conductive tile belongs to a single conductive strip and each side of one tile is adjacent to the side of another tile belonging to another conductive strip.

22 Claims, 5 Drawing Sheets

(58) Field of Classification Search
USPC .......................................................... 324/464
See application file for complete search history.

(56) References Cited

U.S. PATENT DOCUMENTS

| | | | |
|---|---|---|---|
| 10,331,235 B2* | 6/2019 | Fleck | G06F 3/0383 |
| 2003/0173408 A1* | 9/2003 | Mosher, Jr. | G06K 19/04 235/492 |
| 2016/0259432 A1* | 9/2016 | Bau | G06F 3/04182 |

FOREIGN PATENT DOCUMENTS

| | | |
|---|---|---|
| WO | WO2005/086205 | 9/2005 |
| WO | WO2010/091695 | 8/2010 |
| WO | WO2011/041750 | 4/2011 |
| WO | WO2014/153668 | 10/2014 |

OTHER PUBLICATIONS

Belkacem et al. "A New Type of Multiparticle Imaging Detector," Review of Scientific Instruments, vol. 61, No. 3: pp. 945-952 (1990).

Lin et al., "Signal characteristics of a resistive-strip micromegas detector with an integrated two-dimensional readout," Nuclear Instmments and Methods in Physics Research, Section A: Accelerators, Spectrometers, Detectors, and Associated Equipment, vol. 767, pp. 281-288 (2014).

Pinto, Serge Duarte, "Diffraction Applications: Development of Spherical GEMs," Industry-academia matching event on micropattern gaseous detectors, Apr. 26-27, 2012 Annecy, France (19 pages).

Byszewski et al., "Resistive-strips micromegas detectors with two-dimensional readout," $2^{nd}$ International Conference on Micro Pattern Gaseous Detectors Aug. 29-Sep. 1, 2011m Kobe, Japan (9 pages).

Bressan et al., "Two-Dimensional Readout of Gem Detectors," European Laboratory for Particle Physics, 9 pages, (1998).

Karnam, Raveendrababu, "Design and Characterization of a 2m×2m Resistive Plate Chambers (RPCs)" India-based Neutrino Observatory, Tata Institute of Fundamental Research, Mumbai India (16 pages).

L. Latronico, "MicroPattern Gas Detectors with Pixel Read-Out," INFN-sez.Pisa V. Buonarroti 2 , 56100 Pisa (Italy)(8 pages).

* cited by examiner

GASEOUS DETECTOR OF ELEMENTARY PARTICLES

RELATED APPLICATIONS

This application is the national stage of international application PCT/EP2018/053561, filed on Feb. 13, 2018, which claims the benefit of the Feb. 15, 2017 priority date of French application 1751215, the contents of which are herein incorporated by reference.

FIELD OF INVENTION

The invention relates to detector for detecting elementary particles that travel through a gas and, in particular, to a readout plate for such a detector.

BACKGROUND

When an elementary particle passes through a gas, it is possible for it to interact with the gas molecules. In some cases, these interactions result in formation of charged particles. The presence of these charged particles provides a way to detect the elementary particle.

In some cases, the elementary particle interacts with many gas molecules along a trajectory. As a result, it leaves behind a trail of charged particles. By observing the locations of these charged particles and the time in which they were formed, one can obtain a great deal of information about the trajectory of the elementary particle.

An example of such a detector is the MICROMEGAS. This In an article entitled "RESISTIVE-STRIPSMICROMEGAS DETECTORS WITH TWO-DIMENSIONAL READOUT," $2^{ND}$ INTERNATIONAL CONFERENCE ON MICRO PATTERN GASEOUS DETECTORS, Aug. 29-Sep. 1, 2011, Kobe, Japan, M. Byszewski et al. described such a detector.

SUMMARY

In one aspect, the invention features a detector in which all the conductive tiles are located on the same front face of the dielectric layer. These can all be manufactured simultaneously whatever the conductive strip to which they belong. In addition, the smallest dimension of the tiles is large enough to permit them to be made conventional photolithography.

In some embodiments, all the tiles of all the strips may be manufactured simultaneously by wet, dry, or semi-dry etching of a given metallization layer deposited on the front face of the dielectric layer. This simplifies the readout plat's manufacture, and hence that of the detector.

In some embodiments, the tiles all have the same area and are located at the same distance from the exterior face. Under these conditions, the tiles are exposed in the same manner. This means that each tile's sensitivity to an avalanche of secondary charges is independent of the conductive strip to which it belongs. As a result, it is possible to dispense with the need for a mechanism for compensating for differences in sensitivity between the conductive strips. This further simplifies the readout plate's manufacture.

In one aspect, the invention features a readout plate for a detector that detects evidence of elementary particles traveling through gas. Such a readout plate distributes the charges that result from an avalanche of secondary charges over a larger area. This allows tiles with even larger dimensions to be used. Tiles of larger dimensions further simplify the readout plate's manufacture.

Embodiments include those with rhomboid tiles. For conductive strips that cross in only three directions, this shape maximizes spatial resolution for a given smallest dimension of the tile and for a given number of connected conductive strips. The resolution with which the position of the impact point, i.e., the point at which the interaction with the elementary particle occurred, increases as the area of the tile decreases.

Some embodiments feature square tiles. For conductive strips that cross only in four directions, this shape maximizes spatial resolution for a given smallest dimension of the tile.

Other embodiments feature triangular tiles. For a given smallest dimension of the tile, the triangular shape allows the best spatial resolution to be obtained when conductive strips cross in three different directions in such a way that for each direction, there exist superimposed conductive strips that extend along the same line.

A tiling of triangle-shaped tiles allows the position of at least four simultaneous impact points to be determined without ambiguity. Lastly, by suitably short-circuiting the ends of the strips of triangular tiles, it is possible, using the same plate, to obtain strips in which the tiles are of square shape or of rhombus shape or of hexagonal shape or of other geometric shapes formed by juxtaposing a plurality of triangular tiles.

As used herein, a "gaseous detector" is not intended to mean a detector that is made of gas. The "gaseous detector" described herein detects elementary particles that interact with a gas to create charged particles.

These and other features of the invention will be apparent from the following detailed description and the accompanying figures, in which:

In these figures, the same references have been used to reference elements that are the same. For ease of exposition, all figures have been oriented with respect to an orthogonal coordinate system XYZ, where Z is the vertical direction that points upward.

DETAILED DESCRIPTION

Figure 1:
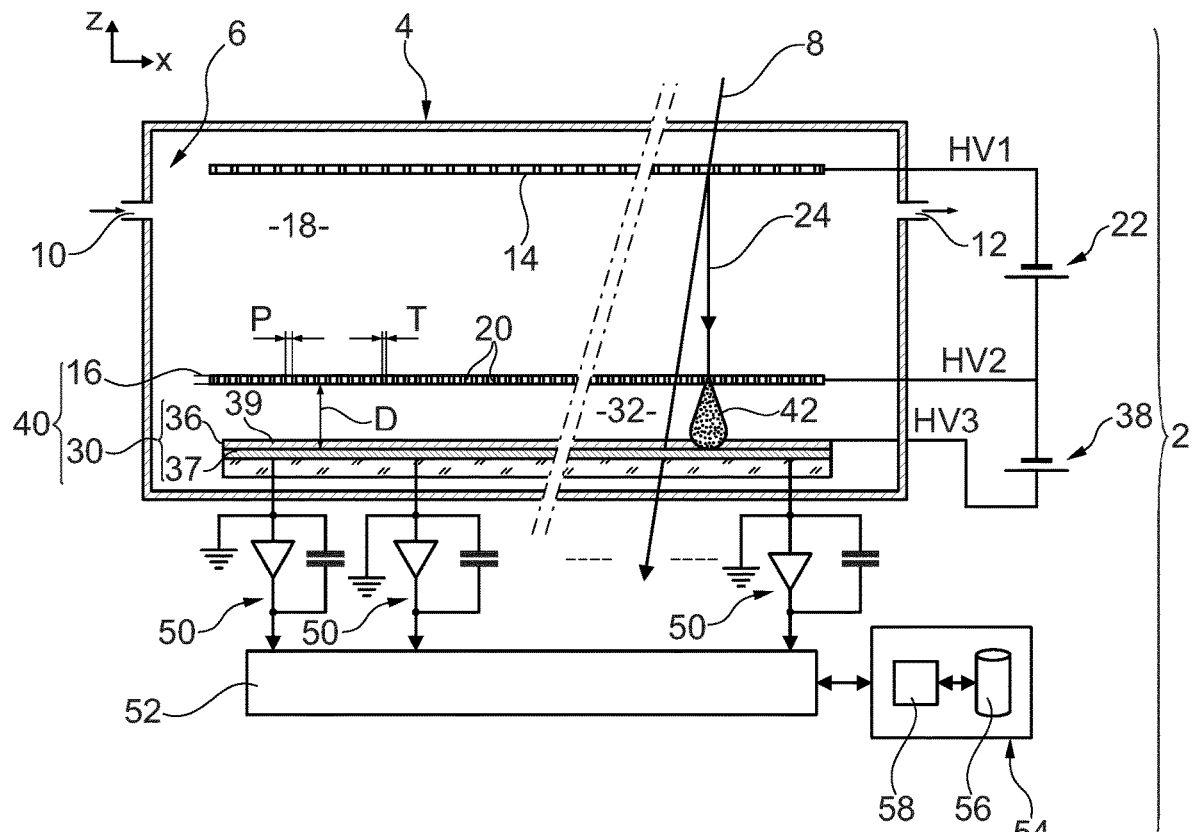
FIG. 1 is vertical cross section through a first embodiment of a detector that detects evidence of elementary particles passing through a gas.

FIG. 1 shows a first detector 2 for detecting elementary particles in a gas.

The first detector 2 comprises a gas chamber 4 that holds a gas 6. The chamber 4 includes first orifice 10 for admitting gas 4 into the chamber 4 and a second orifice 12 through which gas 4 can be evacuated from the chamber 8.

Molecules of the gas 6 ionize in response to an interaction with an elementary particle that travels along a trajectory 8 of such an particle. Examples of such elementary particles include a photon or a proton.

Within the chamber 4, an upper electrode 14 and a horizontal mesh 16, both of which extend in the XY plane, face each other along the Z direction across a first gas-filled volume 18 that defines a first gap between the upper electrode 14 and the mesh 16. In typical embodiments, the first gap is greater than or equal to one to two millimeters and less than one centimeter or five centimeters.

Holes 20 pierce the mesh 16 at regular intervals separated by a pitch spacing P in the X and Y directions. In a typical embodiment, the holes 20 have a diameter T that is smaller than fifty or a hundred micrometers. The pitch spacing P is typically within ±50% or to within ±30% of the diameter T. The mesh 16 is entirely made of an electrically conductive or resistive material.

A power source 22 applies a first potential HV1 to the electrode 14 and a second potential HV2 to the mesh 16. As a result, the power source 22 creates a first electric field across the first gas-filled volume 18. In a typical embodiments, the first electric field has an amplitude between about one kilovolt per centimeter and five kilovolts per centimeter.

The second potential HV2 is higher than the first potential HV1. An elementary particle that collides with a gas molecule creates a primary charge at the impact point. This primary charge is typically an electron that has been torn loose from a gas molecule as a result of an interaction with the elementary particle. The first electric field propels the resulting electron from the impact point towards the mesh 16 along a trajectory 24.

Each impact between an elementary particle and a gas molecule creates free charges. Along a typical trajectory 8, there may be many such collisions and therefore many impact points. By determining the positions of these various successive points, it is possible to project the trajectory 8 of the elementary particle onto the XY plane. In addition, the times at which these collisions occur can be used to deduce t the trajectory of the particle knowing the drift velocity of the primary electrons. A suitable procedure for doing so is described by H. J. Hilke in the article "Time projection chambers", IOP Publishing Ltd, Reports on Progress in Physics, Volume 73, Number 11, Oct. 6, 2010.

A readout plate 30 extends in the XY plane under the mesh 16. A second gas-filled volume 32 between the mesh 16 and the readout plate 30 defines a second gap D. In a typical embodiments, the second gap D is five or ten times smaller than the first gap. In some examples, the second gap D is between fifteen and two hundred micrometers.

The readout plate 30 includes a resistive layer 36. The resistive layer 36 extends horizontally facing the mesh 16. It forms the readout plate's exterior face 39, which directly contacts the second gas-filled volume 32. Conductive strips 37 extend horizontally under the resistive layer 36.

A power source 38 connected to the resistive layer 36 applies, to the resistive layer 36, a third potential HV3. The third potential HV3 is selected such that the difference between the third and second potentials HV3-HV2 is five or ten times higher than the difference between the second and first potentials. Therefore, the electric field present in the second gas-filled volume 32 is five or ten times higher than the electric field present in the first gas-filled volume 18. In some embodiments, the electric field through the second gas-filled volume 32 is greater than or equal to ten kilovolts per centimeter or even fifty kilovolts per centimeter.

The combination of the mesh 16, the second gas-filled volume 32, the resistive layer 36, and the power source 38 defines an amplifying device 40 for amplifying the primary charges that pass through the mesh 16. In particular, the electric field present in the second gas-filled volume 32 accelerates any primary charge that passes through one of the mesh's holes 20. The additional energy thus conferred on the primary charge allows it to ionize more gas molecules. Each time it does so, it creates a secondary charge. The high electric field in the second gas-filled volume 32 immediately accelerates these new secondary charges as well. The resulting chain reaction yields an avalanche 42 of secondary charges. All it takes to trigger this avalanche 42 is one primary charge that passed through the hole 20.

The "size" of an avalanche 42 is defined by the length of the largest side of the rectangle drawn on the exterior face of the readout plate 30 that contains 90% of the impact points between the secondary charges of the avalanche 42 and the exterior face 39. The size is fairly small. In a typical embodiments, it would be smaller than five hundred micrometers and typically smaller than even a hundred micrometers.

The resistive layer 36 distributes the secondary charges of the avalanche 42 over a larger distribution zone. Typically, the size of this distribution zone is M times larger than the size of the avalanche, where M is generally between two and ten. In most embodiments, M is between two and four or between two and five.

The resistive layer 36 extends continuously over the readout plate's exterior face 39. In a typical embodiments, the resistive layer 36 is a single block of material with no apertures. The thickness of the resistive layer 36 is uniform and small. In a typical embodiment, the resistive layer's thickness is less than fifty micrometers or even twenty micrometers. However, its thickness is typically larger than one micrometer of five micrometers.

The resistive layer's sheet resistivity, or surface resistivity, at 20° C. is between ten kilo-ohms per square and a hundred mega-ohms per square. In a preferred embodiments, the resistive layer's sheet resistivity is greater than or equal to a hundred kilo-ohms per square or one mega-ohm per square and, advantageously, lower than ten mega-ohms per square.

Capacitive coupling between the resistive layer 36 and the conductive strips 37 enables the secondary charges received by the resistive layer 36 to generate corresponding variations in the electric charge on certain conductive strips 37. The conductive strips 37 on which the charge varies are located, in the Z direction, under the distribution zone of the avalanche 42 of secondary charges.

Referring to FIG. 1, the readout plate 30 comprises conductive strips 37 that are insulated from each other. Each conductive strip 37 extends between a far end and a near end. The far and near ends of each conductive strip 37 are located on one edge of the readout plate 30. In a typical embodiments, the far end either connects to a resistor or remains free. The near end connects by way of an amplifier 50, to an input of a charge sensor 52. To simplify FIG. 1, the conductive strips 37 have been schematically represented by a single layer and only three amplifiers 50 have been shown.

The charge sensor 52 measures a physical quantity that indicates how much charge is present on each of the conductive strips 37. In a typical embodiments, the charge sensor 52 comprises as many inputs as there are conductive strips 37. This enables the charge sensor 52 to rapidly measure the charge present on each of the conductive strips 37.

In some embodiments, measuring the amount of charge includes signaling that the amount of charge has crossed a preset threshold. In other embodiments, measuring the amount of charge includes systematically generating an electrical quantity representative of the amount of charge actually present on the conductive strip 37.

FIG. 1 also shows a processing unit 54 that includes a memory 56, and a programmable microprocessor 58 that executes instructions stored in the memory 56. These instructions enable the processing unit 54 to carry out the procedures described below.

The processing unit 54 acquires measurements from the sensor 52 and determines, from these acquired measurements and the known arrangement of the conductive strips 37, the positions of the impact points between the elementary particle and the gas 6 that occurred inside the first gas-filled volume 18. In some embodiments, the processing unit 54 determines times at which these impact points occur, and therefore, the trajectory of the elementary particle.

Figure 2:
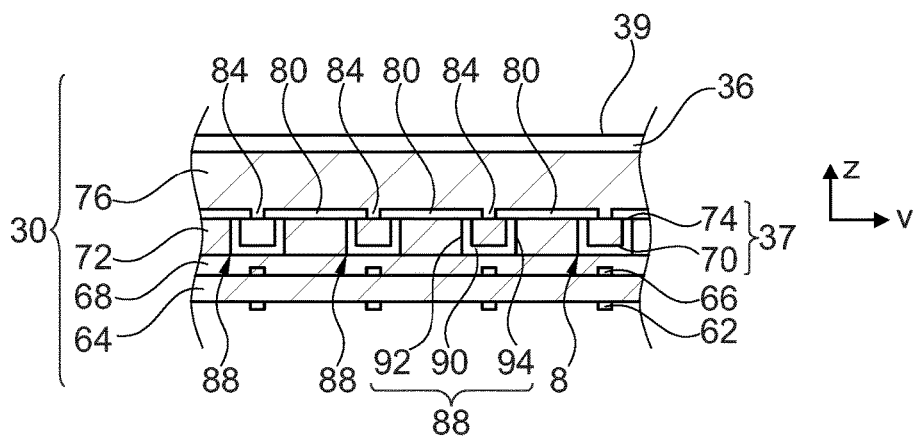
FIG. 2 is a vertical cross section of a readout plate of the detector shown in FIG. 1.

FIG. 2 shows a vertical cross-section of the readout plate 30 along a horizontal direction V. The readout plate 30 comprises a stack of horizontal layers. From bottom to top along the Z direction, the stacked layers are: a lower metallization layer 62, a first dielectric layer 64, a first intermediate metallization layer 66, a second dielectric layer 68, a second intermediate metallization layer 70, a third dielectric layer 72, an upper metallization layer 74 deposited on the front face of the dielectric layer 72, a fourth dielectric layer 76, and finally, the resistive layer 36.

The third dielectric layer 72 is a horizontal layer in which more than 90% of the volume of the layer's volume is made of dielectric material having a thickness that is typically between fifty and a hundred micrometers. A dielectric material is a material having a resistivity at 20° C. that is greater than or equal to $10^{12}$ ohm-meters and, preferably, greater than or equal to $10^{14}$ ohm-meters or $10^{16}$ ohm-meters. Generally, the resistivity of the dielectric material at 20° C. is lower than $10^{28}$ ohm-meters.

The lower metallization layer 62, the first intermediate metallization layer, 66, the second intermediate metallization layer 70, and the upper metallization layer 74 are made of an electrically conductive material. As used herein, an electrically conductive material is one whose resistivity at 20° C. is lower than $10^{-2}$ ohm-meters and, preferably, lower than $10^{-5}$ ohm-meters. Generally, the resistivity of an electrically conductive material at 20° C. is higher than $10^{-10}$ ohm-meters. In a preferred embodiment, the metallization layers are made of copper.

Figure 3:
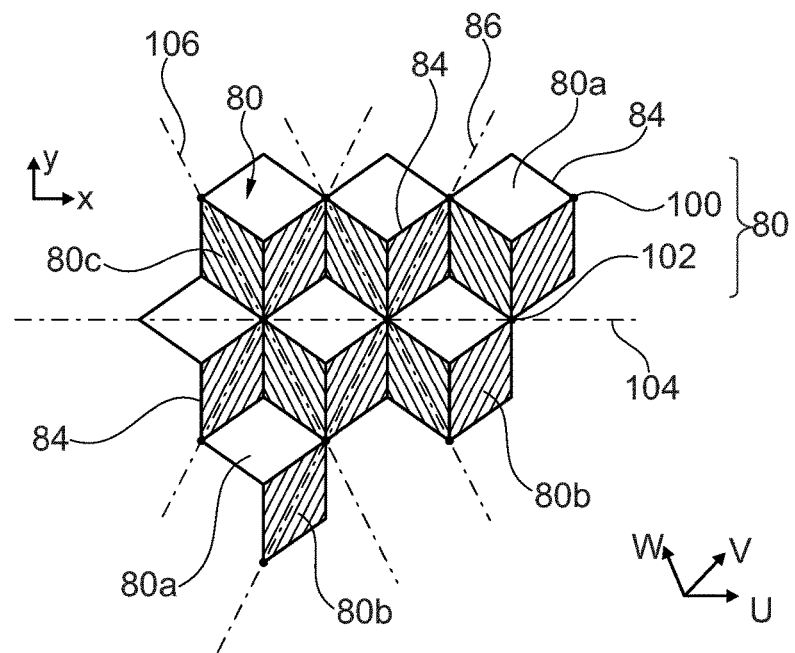
FIG. 3 shows a tile arrangement for tiles in the readout plate shown in FIG. 2.

Referring to FIG. 3, the association of a tile 80 of the dielectric layer 76 and of the resistive layer 36 forms a capacitor. Because the tiles 80 are identical and because all tiles are the same distance from the exterior face 39, all tiles 80 should have the same capacitance.

A secondary charge that strikes the resistive layer 36 above or in proximity to a tile 80 will induce charge of opposite sign to appear in the tile 80 in a manner consistent with the operation of a capacitor. Because the tiles have identical capacitances, the sensitivity of each tile 80 to the presence of a secondary electric charge in the distribution zone facing the resistive layer 36 is equal to those of the other tiles 80.

The smallest dimension of a tile 80 is greater than or equal to three hundred micrometers or five hundred micrometers. In some embodiments, it is greater than one millimeter.

As used herein, "smallest dimension of a tile" refers to the length of the smallest side of the rectangle of smallest area that entirely contains the tile 80.

As used herein, "largest dimension of a tile" refers to the length of the largest side of the same rectangle. The largest dimension of a tile 80 is less than the size of the avalanche's distribution zone. In preferred embodiments, it is two or three times smaller. Particular embodiments include those in which the largest dimension of a tile 80 is smaller than three centimeters and those in which it is smaller than one centimeter.

Figure 4:
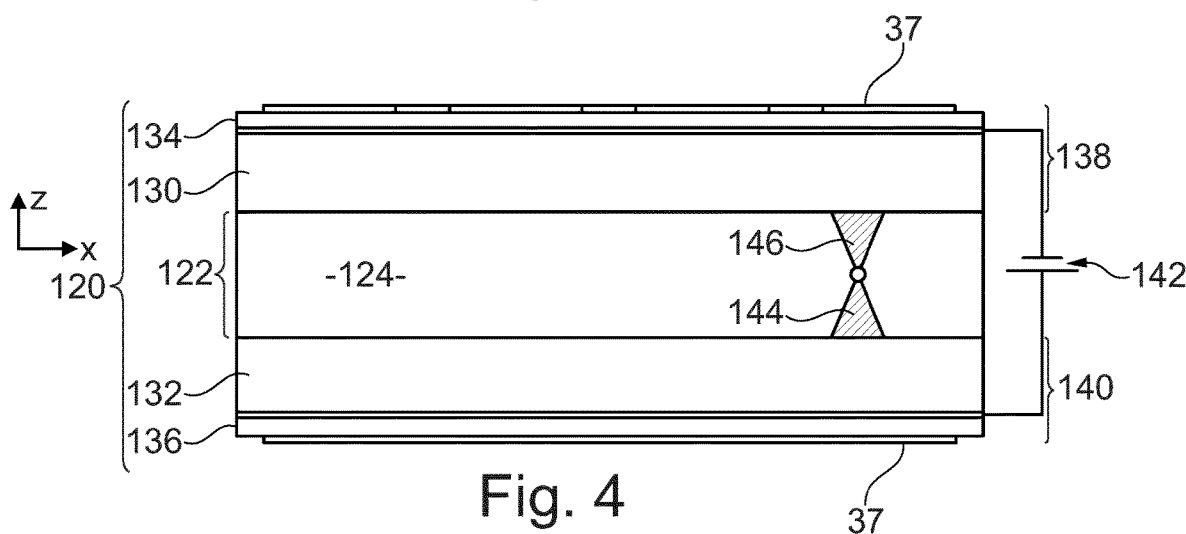
FIG. 4 is a vertical cross section of a second embodiment of a detector that detects evidence of elementary particles passing through a gas.

Referring now to FIG. 4, to form a conductive strip 37 that extends mainly along a horizontal line 86 parallel to the direction V, all the tiles located one after the other along this line 86 are electrically connected in series by way of electrical connections 88. The connections 88 are produced under the front face of the third dielectric layer 72. Each connection 88, which electrically connects first and second tiles 80 that are immediately consecutive along the line 86, comprises a conductive track 90 and first and second vertical conductive pads 92, 94, or "vias."

The conductive track 90 is produced in either the lower metallization layer 62, the first intermediate metallization layer 66, or the second intermediate metallization layer 70. It extends horizontally between a first end located under a first tile 80 and a second end located under a second tile 80.

The first and second vertical conductive pads 92, 94 each pass through one or more of the first dielectric layer 64, the second dielectric layer 68, and the third dielectric layer 72. In doing so, the first and second vertical conductive pads 92, 94 connect the first and second tiles 80 to the first and second ends of the track 90, respectively.

FIG. 3 shows first, second, and third directions U, V, W. The first direction U is parallel to the X direction defined in FIG. 1. The second direction V is offset from the first direction U by 60°. The third directions W is offset from the first direction U by 120°.

With the tiles 80 aligned along a line 86 that extends in the second direction U, the track 90 is produced in the second intermediate metallization layer 70. As a result, the first and second vertical conducting pads 92, 94 pass only through the third dielectric layer 82.

For conductive strips 37 that extend along the first direction U, the lower metallization layer 62 forms the track 90. For conductive strips 37 that extend along the third direction W the first intermediate metallization layer 66 forms the track 90.

FIG. 3 shows an arrangement of tiles 80 on the horizontal front face of the third dielectric layer 72. Gaps 84 separate tiles 80 from each other.

Each tile 80 is a rhombus having a long diagonal and a short diagonal. The rhombus has first and second sharp vertices 100, 102 at each end of the long diagonal. Each sharp vertex 100, 102 forms a 60° angle. Lines show gaps 84 between tiles 80.

The tiles 80 form a tessellation on the front face of the third dielectric layer 72. In the particular embodiment of FIG. 3, the tessellation results from repeating the same pattern in two horizontal directions. Such a tessellation is referred to herein as a "periodic tessellation."

Depending on the nature of the periodic tessellation, different repeated patterns can be used. In the example shown in FIG. 3, the repeated pattern is a hexagon formed by first, second, and third adjacent tiles 80*a*, 80*b*, 80*c*. These have been filled with different textures in the figure to promote ease of identifications. This hexagon pattern repeats periodically in the first, second, and third directions U, V, W.

The long diagonal of the first adjacent tile 80*a* is parallel to the first direction U. The long diagonal of the second adjacent tile 80*b* is parallel to the second direction V. The long diagonal of the third adjacent tile 80*c* is parallel to the third direction W. The first, second, and third adjacent tiles 80*a*, 80*b* and 80*c* share a common vertex.

The second adjacent tiles 80b, namely those whose long diagonal aligns with a first line 86, connect in series from one edge of the tessellation to the opposite edge. This forms a conductive strip 37 that extends along the second direction V. This results in multiple conductive strips 37 along the second direction V that are insulated from each other.

In a similar way, the first adjacent tiles 80a, namely those whose long diagonals align along a second line 104, also connect in series at connections 88, best seen in FIG. 3. This forms conductive strips 37 that are electrically insulated from one another and that extend along the first direction U.

Finally, the third adjacent tiles 80c, namely those whose long diagonals align along a third line 106 also connect in series at connections 88, best seen in FIG. 3. This forms conductive strips 37 that are electrically insulated from one another and that extend along the third direction W.

The dimensions of the arrangements of the tiles 80 are such that it is possible to etch them into the upper metallization layer 74 using simple etching processes, such as photolithography.

In addition, the arrangement is such that when an avalanche 42 occurs, the resulting secondary charges spread above at least three contiguous tiles 80. As a result, the avalanche 42 causes a variation in the electric charge on at least three conductive strips 37, each of which extends in a different direction U, V, W. This resolves the ambiguity that arises when simultaneous avalanches 42 occur at different locations on the readout plate 30. As a result of this arrangement, the processing unit 54 can determine, without ambiguity, the positions of the two corresponding impact points, provided that they are separated by more than the largest dimension of a tile.

An additional benefit arises because all of the conductive strips 37 have the same sensitivity. As a result, the readout plate 30 does not require a way to compensate for differences in sensitivity between different conductive strips 37.

The arrangement also drastically reduces the number of inputs that a charge sensor 52 would require to determine a impact point's position. In those cases in which all tiles 80 are electrically insulated from each other, the charge sensor 52 would require one input per tile 80. In the arrangement described herein, the charge sensor 52 would only need one input per conductive strip 37.

FIG. 4 shows a second detector 120 that comprises a gas chamber 122 that encloses the gas 124. As was the case with the first embodiment, the gas 124 is one that can be ionized by the elementary particle to be detected.

To simplify FIG. 4, the amplifiers, the charge sensor 52 and the processing unit 54 used to determine the position of the impact point have been omitted These would be identical to those that were described in the case of the first detector 2.

The detector 120 includes upper and lower resistive plates 130, 132 that form the chamber's upper and lower walls. The upper and lower resistive plates 130, 132 are entirely made of a highly-resistive material. Because of the resistive plates 130, 132, a detector 120 as shown in FIG. 4 is often referred to as a "resistive-plate chamber."

As used herein, a "highly-resistive material" is one having an electrical resistivity at 20° C. that exceeds $10^6$ ohm-meters. Preferred embodiments have resistivities that equal or exceed $10^7$ ohm-meters or $10^{10}$ ohm-meters. Generally, the electrical resistivity at 20° C. of a highly-resistive material is strictly lower than $10^{12}$ ohm-meters. Typical highly-resistive materials include glass and certain plastics, such as BAKELITE.

In a preferred embodiment, the thicknesses of the upper and lower resistive plates 130, 132 exceed two hundred micrometers and in some cases exceeds even one millimeter. However, the thicknesses of the resistive plates 130, 132 preferably fall short of five millimeters or three millimeters. The thickness of the volume of gas 124 located between the upper and lower resistive plates 130, 132 is typically greater than or equal to one millimeter or two millimeters and generally less than one centimeter or five centimeters.

An upper electrode 134 covers the rear face of the upper resistive plate 130 and a lower electrode 136 covers the rear face of the lower resistive plate 132. The upper and lower electrodes 134, 136 are resistive films that are identical to that used in the resistive layer 36.

A dielectric layer separates the upper electrode 134 from the upper resistive plate 130. A similar dielectric layer separates the lower electrode 136 from the lower resistive plate 132. These dielectric layers correspond to the fourth dielectric layer 76 from the first embodiment. These dielectric layers have a thickness that is typically greater than fifty micrometers and less than three hundred micrometers.

The upper resistive plate 130 and the upper electrode 134 define an upper readout plate 138. The lower resistive plate 132 and the lower electrode 136 define a lower readout plate 140.

The architecture of the upper and lower readout plates 130, 138 is identical that of the readout plate 30 in the first embodiment. In particular, the upper and lower electrodes 134, 136 correspond to the resistive layer 36 of the readout plate 30 in the first embodiment and the dielectric layers adjacent to the upper and lower electrodes 134, 136 correspond to the fourth dielectric layer 76.

A voltage source 142 applies a potential difference between the upper and lower electrodes 134, 136. As was the case in the first embodiment, this results in an electric field that promotes a first avalanche 144. This first avalanche 144 consists of negatively-charged secondary charges that strike the lower electrode 136 in response to the creation of a primary charge within the chamber 122.

In a typical case, the primary charge is an electron that has been torn loose from a molecule of gas 124 as a result of interaction with the elementary particle. This leaves behind a positively-charged ion. The same electric field accelerates the positively-charged ion towards the upper electrode 134, where it causes a second avalanche 146. This second avalanche 146 consists of a shower of positive secondary charges.

As a result, the upper and lower readout plates 138, 140 allow the processor 54 to determine the position of the impact point based on the positions of both the first and second avalanches 144, 146.

Figure 5:
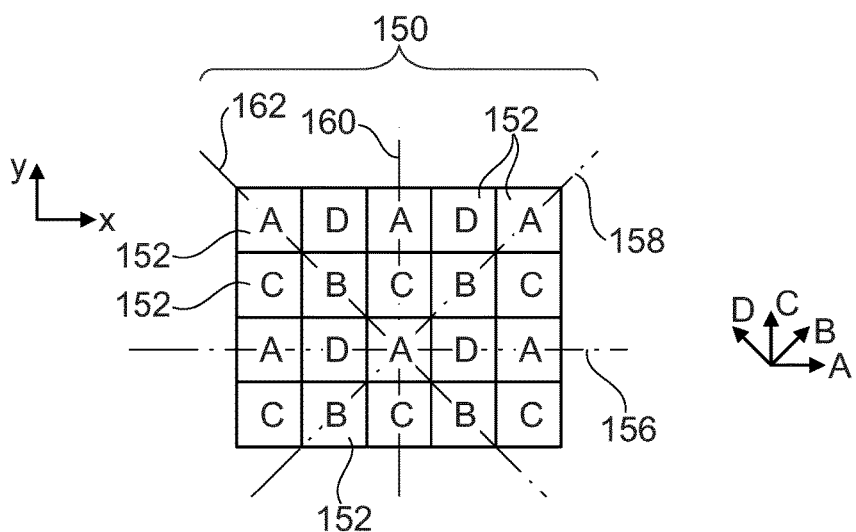
FIGS. 5, 6, 7, 8, 9 and 10 illustrates alternative tile arrangements for a readout plate such as that shown in FIG. 2.

FIG. 5 shows a readout plate 150 identical to the readout plate 30 described in connection with the first detector 2 but using uses square tiles 152. The readout plate 150 can be used with either the first or second detector 2, 120.

In the readout plate 150, the repeated pattern that forms the periodic tessellation on the front face of the third dielectric layer 72 is a square that repeats periodically in first through fourth directions A, B, C and D. The first direction A is parallel to the X direction. The second through fourth directions B, C and D are angularly offset from the first direction 45°, 90°, and 135° respectively.

The tiles 152 are electrically connected to one another by connections similar to the connections 88 so as to form conductive strips that extend parallel to the four directions A, B, C and D.

In FIG. 5, the symbol "A" identifies tiles 150 that form a conductive strip that extends parallel to the first direction A. Similarly, the symbols "B", "C" and "D" identify tiles 152 used to form conductive strips parallel to the second, third, and fourth directions B, C and D, respectively.

For example, among the tiles 152 that extends along a line 156 parallel to the first direction A, only one tile 152 in two, i.e., every other tile, is electrically connected to the other tiles 152 of this set. Thus, a tile belonging to another conductive strip is interposed between each pair of successive tiles 152 belonging to the conductive strip that extends along the line 156 parallel to the first direction A. In this embodiment shown in FIG. 5, the interposed tile 152 belongs to a conductive strip that extends in the fourth direction D.

Similarly, among the set of tiles 152 that extends along a line 158 parallel to the second direction B, only one tile 152 in two, i.e., every other tile, electrically connects to the other tiles 152 of this set. The same goes for the tiles 152 that form the conductive strips that extend along the third direction C (line 160) and the fourth direction D (line 162) respectively.

In this embodiment, with the exception of the tiles 152 located on the edges of the tessellation, each tile 152 is encircled only by tiles 152 belonging to other strips extending in three different other directions. This is true for all tiles 152 selected inside the tessellation. As a result, an impact between an elementary particle and the gas 6 charges at least four conductive strips, each extending in a different direction. This makes it possible to determine, without ambiguity, the position of three simultaneous impact points, provided that the distance separating these impact points pairwise is larger than the largest dimension of the tile.

Figure 6:
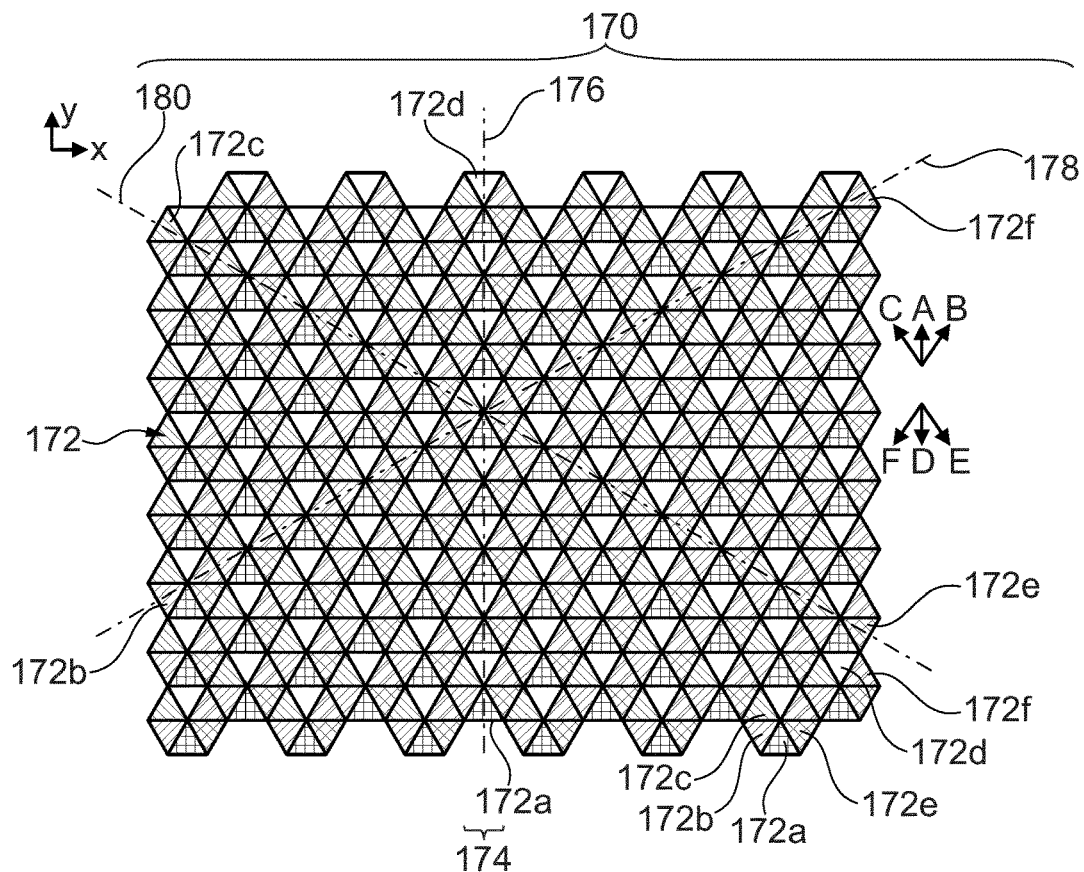

FIG. 6 shows a readout plate 170 that is identical to the readout plate 30 except that it uses triangular tiles 172. More precisely, each tile 172 is an equilateral or isosceles triangle. In this embodiment, the tiles 172 are electrically connected to one another so as to form conductive strips 174 that extend parallel to first through sixth directions A, B, C, D, E and F.

The first and fourth directions A, D are parallel to the Y direction. The second and fifth directions B and E are angularly offset by −60° with respect to the first and fourth directions A, D, respectively. The third and fifth directions C, E are angularly offset by +60° with respect to the first and fourth directions A, D, respectively.

In FIG. 6, the reference numbers 172a, 172b, 172c, 172d, 172e and 172f identify those tiles 172 that belong to conductive strips parallel to the directions A, B, C, D, E and F, respectively. To simplify FIG. 6 and the following figures, each tile that belongs to a conductive strip that extends parallel to a preset direction is filled with a respective texture. This allows a tile to be recognized as being associated with a conductive strip in the plate 170 even in the absence of a reference number.

In the tessellation of FIG. 6, the periodically repeated pattern is a hexagon comprising one example of each of the tiles 172a, 172b, 172c, 172d, 172e and 172f. In this pattern, the tiles 172a, 172b, 172c, 172d, 172e and 172f share a common vertex located at the geometric center of the hexagon. This hexagon is periodically repeated in the first, second, and third directions A, B, C.

The tiles 172a and 172d are aligned along lines parallel to the first and fourth directions A, D such as the line 176. Along the line 176, a tile 172d is interposed between each pair of successive tiles 172a.

The tiles 172b and 172f are aligned along lines parallel to the second and sixth directions B, F such as the line 178. Along the line 178, a tile 172b is interposed between each pair of successive tiles 172f.

The tiles 172c and 172e are aligned along lines parallel to the third and fifth directions C, E such as the line 180. Along the line 180, a tile 172c is interposed between each pair of successive tiles 172e.

By virtue of this arrangement and this connection of the tiles 172 to one another, each tile 172 that is not located on an edge of the tessellation is immediately encircled by tiles 172 belonging to five different conductive strips. Thus, each impact point results in a variation in the electric charge on at least six different conductive strips. With the plate 170, it is therefore possible to determine, without ambiguity, the position of five simultaneous impact points if the distance separating these impact points pairwise is larger than the largest dimension of the tile.

Figure 7:
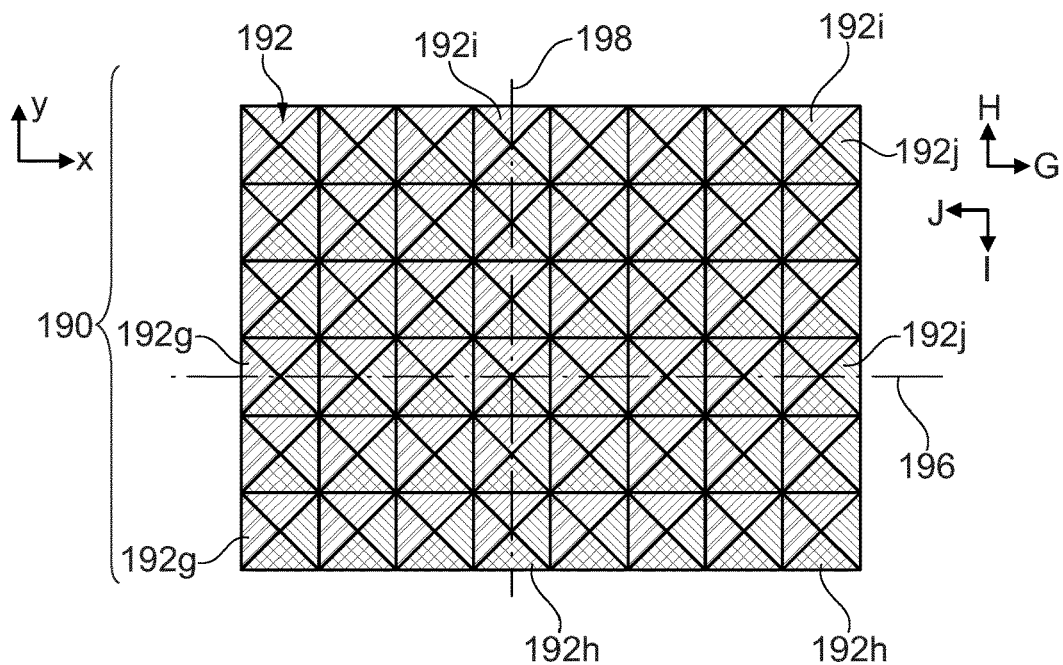

FIG. 7 shows a readout plate 190 that is identical to the readout plate 170, in which the tiles 172 have been replaced by tiles 192. The tiles 192 are identical to the tiles 172 except that they are arranged differently on the front face of the dielectric layer 72. In addition, in this embodiment, the tiles 192 are electrically connected to one another so as to form conductive strips that extend parallel to four directions G, H, I and J. The directions G and I are parallel to the X direction and the directions H and I are angularly offset by 90° with respect to the directions G and J, respectively. In FIG. 7, the reference numbers 192g, 192h, 192i and 192j have been used to reference the tiles 192 that belong to conductive strips parallel to the directions G, H, I, and J, respectively. In this tessellation, the periodically repeated pattern is a square composed of one example of each of the tiles 192g, 192h, 192i and 192j. Inside this pattern, these tiles 192g, 192h, 192i and 192j share a common vertex located at the center of the square.

The tiles 192g and 192j are aligned along lines parallel to the directions G and J such as the line 196. Along this line 196, a tile 192j is interposed between each pair of successive tiles 192g.

The tiles 192h and 192i are aligned along lines parallel to the directions H and I such as the line 198. Along the line 198, a tile 192i is interposed between each pair of successive tiles 192h.

By virtue of this arrangement and this electrical connection of the tiles 192 to one another, each tile 192 that is not located on an edge of the tessellation is immediately encircled by tiles 192 belonging to three different conductive strips. Thus, each impact point results in a variation in the electric charge on at least four different conductive strips. It is therefore possible to determine, without ambiguity, the position of three simultaneous impact points with the readout plate 190 if the distance separating these impact points pairwise is larger than the largest dimension of the tile.

Figure 8:
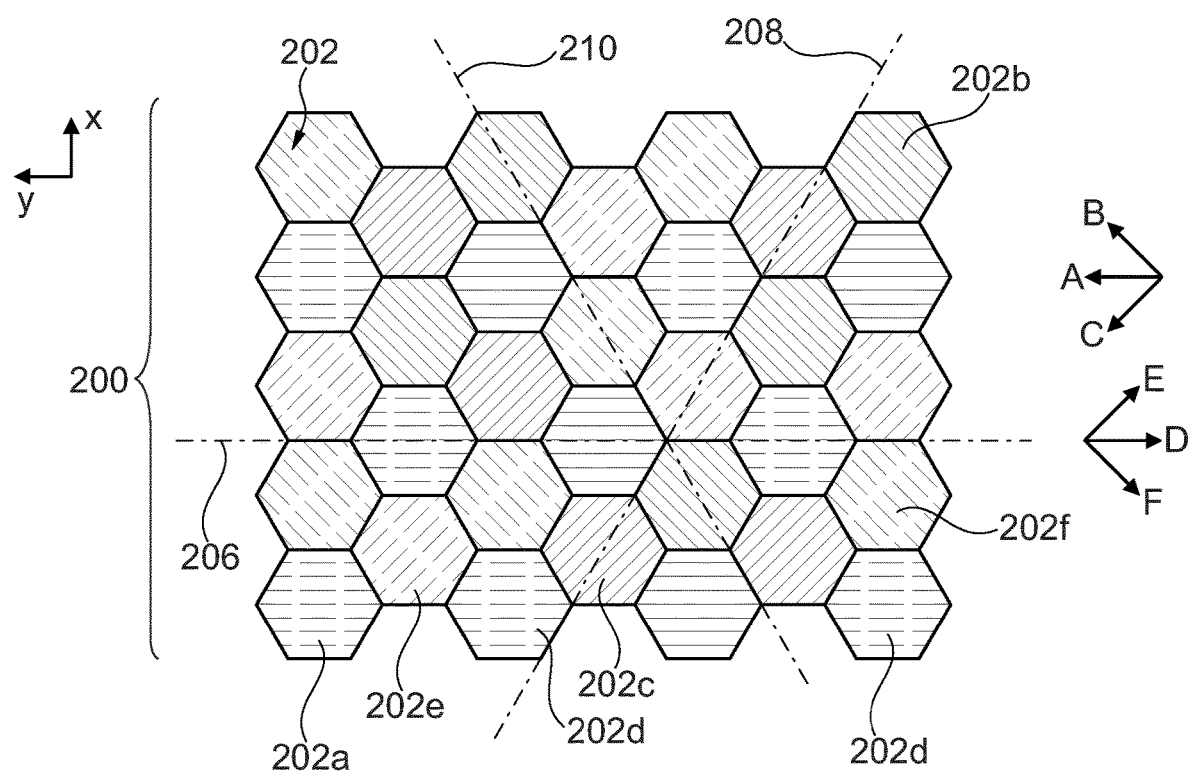

FIG. 8 shows a readout plate 200 that is identical to the readout plate 30 except that the tiles 80 have been replaced by tiles 202. The tiles 202 are identical to the tiles 80 except that they are of hexagonal shape. In this embodiment, the tiles 202 are electrically connected to one another so as to form conductive strips that extend parallel to six directions A, B, C, D, E and F. These directions are the same as those defined for the plate 170. In FIG. 8, the references 202a, 202b, 202c, 202d, 202e and 202f have been used to reference the tiles 202 that belong to conductive strips parallel to the directions A, B, C, D, E and F, respectively.

The tiles 202a and 202d are aligned along lines parallel to the directions A and D such as the line 206. Along the line 206, a tile 202d is interposed between each pair of successive tiles 202a.

The tiles 202b and 202f are aligned along lines parallel to the directions B and F such as the line 210. Along the line 210, a tile 202b is interposed between each pair of successive tiles 202f.

The tiles 202c and 202e are aligned along lines parallel to the directions C and E such as the line 208. Along the line 208, a tile 202c is interposed between each pair of successive tiles 202e.

By virtue of this arrangement of the tiles 202, the plate 200 makes it possible to determine, without ambiguity, the position of five simultaneous impact points if the distance separating these impact points pairwise is larger than the largest dimension of the tile. However, for tiles 202 having the same largest dimension as the tiles 172, the obtained spatial resolution is better with the embodiment of FIG. 6. Specifically, even though the tiles 202 and 172 have the same largest dimension, the area of the tiles 172 is smaller, this improving spatial resolution.

Figure 9:
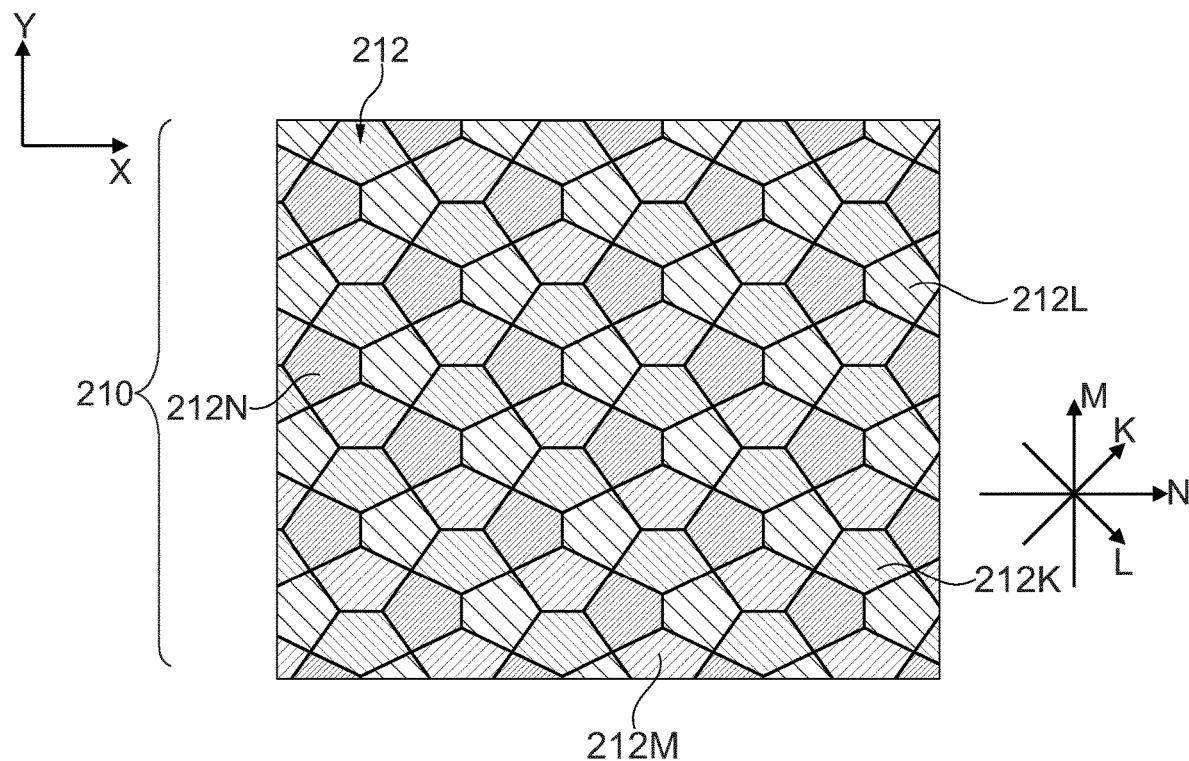

FIG. 9 shows a readout plate 210 that is identical to the readout plate 30 except that the tiles 80 have been replaced by tiles 212. The tiles 212 are identical to the tiles 80 except that they are of pentagonal shape. In this embodiment, the tiles 212 are electrically connected to one another so as to form conductive strips that extend parallel to four directions K, L, M and N. The directions N and M are parallel to the X and Y directions, respectively. The directions K and L are angularly offset with respect to the direction N by +45° and −45°, respectively. In FIG. 9, the references 212K, 212L, 212M and 212N have been used to reference the tiles 212 that belong to conductive strips parallel to the directions K, L, M and N, respectively. The connections between the tiles 212 to achieve this result may be deduced from the arrangement of the tiles 212 shown in FIG. 9 and the above explanations given in the case of tiles of other shapes.

Figure 10:
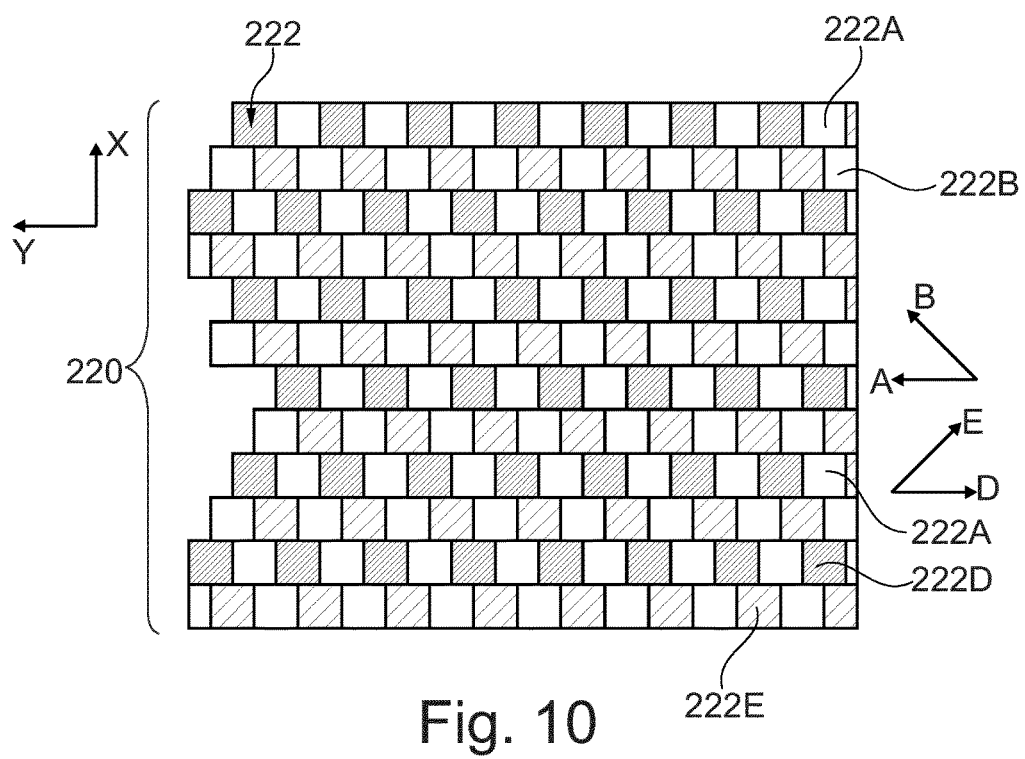

FIG. 10 shows a readout plate 220 that is identical to the plate 150 except that the tiles are arranged differently with respect to one another. In this figure, square tiles have been given the generic reference 222. In this embodiment, the tiles 222 are electrically connected to one another so as to form conductive strips that extend parallel to four directions A, B, D and E. The directions A, B, D and E are the same as those defined for the embodiment of FIG. 8. In FIG. 10, the references 222A, 222B, 222D and 222E have been used to reference the tiles 222 that belong to conductive strips parallel to the directions A, B, D and E, respectively. The connections between the tiles 222 to achieve this result may be deduced from the arrangement of the tiles 222 shown in FIG. 10 and the above explanations given in the case of tiles of other shapes.

A variety of different gases can be used in the gas chamber. What is important is that the gas be one that is susceptible to being ionized upon passage of the elementary particle that is to be detected. Examples of suitable gases include propane, methane, helium, isobutane, xenon, and argon.

The extent of the first gap, which is the thickness of the first gas-filled volume 18, may be larger than one meter. An example is the time projection chamber (TPC) described in H. J. Hilke's article entitled "Time projection chambers" and published on Oct. 6, 2010 by TOP Publishing Ltd, Reports on Progress in Physics, Volume 73, Number 11.

The number of readout plates in the detector 2 is variable. Some, such as that shown in FIG. 4, have plural readout plates. However, other embodiments omit one or more readout plates 138, 140 from the detector 120.

Other embodiments of the charge sensor 52 are possible. For example, the electric-charge sensor may comprise a multiplexer that connects, in alternation in time, the end of a plurality of conductive strips to the input of the same transducer able to convert the electric charge stored on the currently connected conductive strip into an electrical signal, which is acquired by the processing unit.

The processing unit may be formed differently. For example, the microprocessor 58 may be programmed to solely store in the memory 56 the measurements taken by the charge sensor 52. Preferably, for each of these measurements, the time at which it was taken and the identifier of the conductive strip on which the electric charge was measured are also stored. In contrast, the microprocessor 58 is incapable of implementing the processing operations required to determine the position of the impact point. To this end, the processing unit then comprises a separate computer able to acquire the measurements stored in the memory 56 and to process them automatically in order to determine the position of the impact point. The processing carried out by the computer may be triggered long after the measurements are stored in the memory 56.

The readout plates described above may be used in other types of gaseous detectors. For example, the readout plates described here may also be employed in a gaseous detector of the type known by the acronym GEM (for "Gas Electron Multiplier"). For example, one embodiment of such a gaseous detector is described in detail in patent applications EP948803 and WO2014153668 A1.

As a variant, the detector may comprise a succession of a plurality of amplifying devices. For example, in the case of a MICROMEGAS detector, the latter may comprise a plurality of meshes stacked on top of one another in the Z direction and separated from one another by respective volumes of gas. In this case, an additional power source is provided to apply potential differences between these various meshes, apt to generate a succession of secondary avalanches. Similarly, in a GEM detector, it is also possible to stack a plurality of amplifying devices on top of one another so as to increase the amplification factor.

It is also possible to combine the amplifying devices of GEM detectors and of MICROMEGAS detectors by stacking, for example, the amplifying device of the GEM detector above the mesh of the MICROMEGAS detector.

In the case of an RPC detector, the plate 132, the electrode 136 and the dielectric layer 76 may be omitted. In this case, it is the conductive strips that are connected to suitable potentials in order to play the role of the electrode 136. In this embodiment, the secondary charges of the avalanche 144 then strike the conductive strips directly. This is possible in the case of an RPC detector because the thickness of the volume of gas 124 is much larger than in the case, for example, of a MICROMEGAS detector or of a GEM detector. For this reason, the avalanche 144 is large in size by the time it reaches the conductive strips and the tiles 80. By large in size, what is meant is a size larger than or equal to one millimeter to three millimeters. Thus, it is possible to do without the resistive layer while still being able to systematically distribute the secondary charges over a plurality of tiles even though the smallest dimension of these tiles is larger than 300 micrometers or 500 micrometers.

In another embodiment, only the electrode 136 is omitted. In this case, the conductive strips are connected to suitable potentials in order to in addition play the role of the electrode 136.

What was described above for the particular case of an RPC detector comprising a single volume of gas also applies to the case of RPC detectors in which the gas chamber is divided so that a plurality of volumes of gas are stacked on top of one another in the Z direction. In this case, the gas chamber in addition comprises, between each of these volumes of gas, a glass or plastic sheet that separates them. An RPC detector arranged in such a way is known as a "multigap RPC" as explained in the following article: E Cerron Zeballos et al: "A new type of resistive plate chamber: the multigap RPC", NIMA, volume 374, Issue 1, May 11, 1996, pages 132-135.

In some embodiments, the readout plate 30 is not planar but curved. Such a configuration of the readout plate may, for example, be obtained by curving the planar readout plates described above. Examples include readout plates that are cylindrical or spherical or any other shape.

Some embodiments have an increased number of conductive strips parallel to a given direction. This can be achieved by connecting only one tile in three or only one tile in four or more among the set of tiles aligned along the given direction.

Other embodiments feature conductive strips 37 that align with only two of the three directions. This can occur when square tiles are used.

In such embodiments, it is possible to form conductive strips 37 parallel to the X and Y directions by connecting, in series, one tile in two among the tiles aligned parallel to the X direction and one tile in two among the tiles aligned parallel to the Y direction.

For a given tessellation of the front face of the third dielectric layer 72, there are often several possible ways of connecting the tiles 80 to one another so as to form conductive strips 37. Other embodiments rely on these different ways of connecting tiles 80 to each other. For example, other manners of connecting the tiles 80 to one another are also possible.

A variety of shapes can be used for the tiles 80 to create a periodic tessellation on the front face of the third dielectric layer 72. Examples include rectangular tiles and polygonal tiles in which the sides are the same length.

Other embodiments include those in which the tiles 80 are circular and those in which the tiles 80 have a more ovoid shape, such as that of a potato. However, in the latter case, the tiles 80 would not necessarily form a tessellation even if each tile were to be repeated at regular intervals in a plurality of different directions so as to distribute it uniformly over the front face of the dielectric layer 72.

In some embodiments, the tile arrangement is such that each side of a tile 80 no longer systematically extends parallel to one or more sides of other identical tiles. This can result in gaps of variable width between tiles 80. This would be the case, for example, when circular tiles 80 are used.

In other embodiments, the readout plate 30 comprises additional layers. Among these are embodiments in which the readout plate 30 comprises an additional dielectric layer that has been deposited on the resistive layer 36. Small conductive pads that pass through the dielectric layer increase the readout plate's robustness in the presence of electrical discharge. Examples of such pads can be seen in WO2010/091685, the contents of which are herein incorporated by reference.

Some embodiments feature a resistive layer 36 deposited directly on the conductive strips. This is particularly useful for an RPC detector. Such embodiments omit the fourth dielectric layer 76. The resistive layer 36 makes direct electrical contact with the tiles 80 and distributes the secondary charges of an avalanche 42 over a set of tiles 80 by scattering them.

Additional embodiments include those in which the end of the conductive strip 37 opposite the end connected to the charge sensor 52 connects to a reference potential instead of being left to float.

Having described the invention and a preferred embodiment thereof, what is claimed as new and secured by Letters Patent is:

1. An apparatus comprising a gaseous elementary-particle detector, wherein said detector comprises a gas chamber, an amplifier, a readout plate, a charge sensor, and a processing unit, wherein said gas chamber is configured to enclose a gas that, when passed through by an elementary particle, yields a primary charge, said primary charge being carried by one of an ion and an electron, wherein said amplifier produces an avalanche of secondary charges from said primary charge, wherein said readout plate is arranged to be struck by said avalanche, wherein said readout plate comprises an exterior face, a dielectric layer, and conductive strips, wherein said charge sensor is configured to receive, from each of said conductive strips, information indicative of an amount of charge on said conductive strip and to provide data to said processing unit indicative of said amount of charge on each of said conductive strips, wherein said processing unit is configured to determine an impact point at which said elementary particle interacted with a gas molecule in said gas based on amount of charge measured on each of said conductive strips by said charge sensor and from known positions of said strips on said readout plate, wherein said exterior face of said readout plate is arranged so as to be struck by said avalanche of secondary charges, wherein said dielectric layer has a front face turned towards said exterior face, wherein said conductive strips extend parallel to said front face in at least two different directions, wherein each conductive strip extends from a first end to a second end, wherein each conductive strip electrically connects to a corresponding input of said charge sensor, wherein said conductive strips comprise identical conductive tiles that are equidistant from said exterior face, wherein said conductive tiles are distributed over said front face of said dielectric layer, wherein dielectric material mechanically separates said tiles from each other, wherein for each tile, there exist rectangles, each of which entirely contains said tile, wherein, within said rectangles, each of which entirely contains said tile, there exists a smallest rectangle, wherein said smallest rectangle has an area that is smaller than areas of all other rectangles in said rectangles, each of which entirely contains said tile, wherein said smallest rectangle has a longer side and shortest side, wherein said shortest side has a length that is smaller than that of said longest side, wherein said length of said shortest side defines a smallest dimension of said tile, wherein said smallest dimension exceeds three hundred micrometers, wherein said electrical connections are disposed under said dielectric layer, wherein said electrical connections electrically connect said conductive tiles in series so as to form said conductive strips, wherein said electrical connections are arranged such that each conductive tile belongs to at most a single conductive strip and such that each side of a first tile is adjacent to a side of a second tile, wherein said first and second conductive tiles belong to different conductive strips, wherein said detector further comprises a highly-resistive plate, a first electrode, a second electrode, and a power source, wherein said highly-resistive plate comprises a front face and a rear face, wherein said front face directly contacts said gas, wherein said rear face is opposite said front face, wherein said highly-resistive plate is made of a material having a resistivity at twenty degrees Celsius that is between one million ohms per centimeter and one trillion ohms per centimeter, and a rear face, wherein said first electrode is a planar electrode, wherein said first electrode is located on said rear face of said highly-resistive plate, wherein said second electrode is separated from said highly-resistive plate by a volume of said gas, wherein said second electrode is selected from the group consisting of a resistive film and conductive strips, wherein said power source applies a potential difference between said first and second electrodes, wherein said potential difference is selected to be capable of generating an avalanche of secondary charges in response to appearance of a primary charge within said gas, and wherein said first and second electrodes, said power source, and said gas define said amplifier.

2. An apparatus comprising a readout plate for use with a detector that detects evidence of elementary particles passing through a gas, wherein said readout place comprises an exterior face, a first dielectric layer, and conductive strips, wherein said first dielectric layer comprises a front face that is turned toward said exterior face, wherein said exterior face is arranged to be struck by an avalanche of secondary charges, wherein said conductive strips extend parallel to said front face in at least two directions, wherein each conductive strip extends from a first end to a second end thereof, wherein said second end is configured for connection to a charge sensor, wherein said conductive strips comprise conductive tiles and electrical connections, wherein said conductive tiles are identical to each other, wherein said conductive tiles are all equidistant from said exterior face, wherein said conductive tiles are distributed over said front face of said first dielectric layer, wherein said conductive tiles are mechanically separated from each other by a dielectric, wherein for each tile, there exist rectangles, each of which entirely contains said tile, wherein, within said rectangles, each of which entirely contains said tile, there exists a smallest rectangle, wherein said smallest rectangle has an area that is smaller than areas of all other rectangles, each of which entirely contains said tile, wherein said smallest rectangle has a longer side and shortest side, wherein said shortest side has a length that is smaller than that of said longest side, wherein said length of said shortest side defines a smallest dimension of said tile, wherein said smallest dimension exceeds three hundred micrometers, wherein said electrical connections are located under said first dielectric layer, wherein said electrical connections electrically connect said conductive tiles in series to form said conductive strips, wherein said electrical connections are arranged such that each conductive tile belongs to at most a single conductive strip and such that each side of a first tile is adjacent to a side of a second tile, wherein said first and second conductive tiles belong to different conductive strips, wherein each tile is a rhombus that has a longer diagonal and a shorter diagonal, wherein, for each rhombus, there exist four vertices of which two are opposed sharpest vertices, wherein said longer diagonal passes through said opposed sharpest vertices, wherein sides of said rhombus that meet at said sharpest vertices meet at an angle of sixty degrees, wherein each of said conductive tiles belongs to one of first, second, and third sets of conductive tiles, wherein said first set includes all conductive tiles having a longer diagonal that aligns with a first direction, wherein said second set includes all conductive tiles having a longer diagonal that aligns with a second direction, wherein said second set includes all conductive tiles having a longer diagonal that aligns with a third direction, wherein said second direction is angularly offset by sixty degrees from said first direction, wherein said third direction is angularly offset by one hundred twenty degrees from said first direction, wherein said electrical connections connect conductive tiles in said first set of conductive tiles in series, wherein said electrical connections connect conductive tiles in said second set of conductive tiles in series, and wherein said electrical connections connect conductive tiles in said third set of conductive tiles in series.

3. The apparatus of claim 2, wherein said readout plate further comprises a resistive layer, wherein said resistive layer covers all of said conductive strips, wherein said resistive layer is configured to receive a distribution of secondary charges incident thereon as a result of an avalanche of said secondary charges and to broaden said distribution above a plurality of conductive strips, and wherein said conductive tiles are equidistant from said resistive layer.

4. The apparatus of claim 3, wherein said readout plate comprises a second dielectric layer interposed between said resistive layer and said conductive strips, wherein said second dielectric layer covers said conductive strips, wherein a stack that includes a conductive strip, said second dielectric layer and said resistive layer forms a capacitor.

5. An apparatus comprising a readout plate for use with a detector that detects evidence of elementary particles passing through a gas, wherein said readout place comprises an exterior face, a first dielectric layer, and conductive strips, wherein said first dielectric layer comprises a front face that is turned toward said exterior face, wherein said exterior face is arranged to be struck by an avalanche of secondary charges, wherein said conductive strips extend parallel to said front face in at least two directions, wherein each conductive strip extends from a first end to a second end thereof, wherein said second end is configured for connection to a charge sensor, wherein said conductive strips comprise conductive tiles and electrical connections, wherein said conductive tiles are identical to each other, wherein said conductive tiles are all equidistant from said exterior face, wherein said conductive tiles are distributed over said front face of said first dielectric layer, wherein said conductive tiles are mechanically separated from each other by a dielectric, wherein for each tile, there exist rectangles, each of which entirely contains said tile, wherein, within said rectangles, each of which entirely contains said tile, there exists a smallest rectangle, wherein said smallest rectangle has an area that is smaller than areas of all other rectangles, each of which entirely contains said tile, wherein said smallest rectangle has a longer side and shortest side, wherein said shortest side has a length that is smaller than that of said longest side, wherein said length of said shortest side defines a smallest dimension of said tile, wherein said smallest dimension exceeds three hundred micrometers, wherein said electrical connections are located under said first dielectric layer, wherein said electrical connections electrically connect said conductive tiles in series to form said conductive strips, wherein said electrical connections are arranged such that each conductive tile belongs to at most a single conductive strip and such that each side of a first tile is adjacent to a side of a second tile, and wherein said first and second conductive tiles belong to different conductive strips, wherein each tile is a square, wherein each of said conductive tiles belongs to one of first, second, third, and fourth sets of conductive tiles, wherein said first set includes conductive tiles aligned with one another along a first direction, wherein said second set includes conductive tiles aligned with one another along a second direction, wherein said third set includes conductive tiles aligned with one another along a third direction, wherein said fourth set includes conductive tiles aligned with one another along a fourth direction, wherein said second direction is angularly offset from said first direction by forty-five degrees, wherein said third direction is angularly offset from said first direction by ninety degrees, wherein said fourth direction is angularly offset from said first direction by one hundred and thirty-five degrees, wherein said electrical connections connect one tile in two in series from said first set, wherein said electrical connections connect one tile in two in series from said second set, wherein said electrical connections connect one tile in two in series from said third set, and wherein said electrical connections connect one tile in two in series from said fourth set.

6. An apparatus comprising a readout plate for use with a detector that detects evidence of elementary particles passing through a gas, wherein said readout place comprises an exterior face, a first dielectric layer, and conductive strips, wherein said first dielectric layer comprises a front face that is turned toward said exterior face, wherein said exterior face is arranged to be struck by an avalanche of secondary charges, wherein said conductive strips extend parallel to said front face in at least two directions, wherein each conductive strip extends from a first end to a second end thereof, wherein said second end is configured for connection to a charge sensor, wherein said conductive strips comprise conductive tiles and electrical connections, wherein said conductive tiles are identical to each other, wherein said conductive tiles are all equidistant from said exterior face, wherein said conductive tiles are distributed over said front face of said first dielectric layer, wherein said conductive tiles are mechanically separated from each other by a dielectric, wherein for each tile, there exist rectangles, each of which entirely contains said tile, wherein, within said rectangles, each of which entirely contains said tile, there exists a smallest rectangle, wherein said smallest rectangle has an area that is smaller than areas of all other rectangles, each of which entirely contains said tile, wherein said smallest rectangle has a longer side and shortest side, wherein said shortest side has a length that is smaller than that of said longest side, wherein said length of said shortest side defines a smallest dimension of said tile, wherein said smallest dimension exceeds three hundred micrometers, wherein said electrical connections are located under said first dielectric layer, wherein said electrical connections electrically connect said conductive tiles in series to form said conductive strips, wherein said electrical connections are arranged such that each conductive tile belongs to at most a single conductive strip and such that each side of a first tile is adjacent to a side of a second tile, wherein said first and second conductive tiles belong to different conductive strips, wherein each conductive tile is a triangle, wherein said conductive tiles belong to one of a first set and a second set, wherein said first set includes all conductive tiles that are aligned along a first direction, wherein said second set includes all conductive tiles that are aligned along a second direction that differs from said first direction, wherein said electrical connections connect one in two conductive tiles from said first set in series, wherein, as a result, within said first set, there exist first conductive tiles and second conductive tiles, wherein said first conductive tiles consist of tiles that are connected in series by said electrical connections, wherein said second conductive tiles consist of tiles that are connected in series by said electrical connections, wherein said first and second conductive tiles are electrically insulated from each other, wherein said electrical connections connect one in two conductive tiles from said second set in series, wherein, as a result, within said second set, there exist third conductive tiles and fourth conductive tiles, wherein said third conductive tiles consist of tiles that are connected in series by said electrical connections, wherein said fourth conductive tiles consist of tiles that are connected in series by said electrical connections, and wherein said third and fourth conductive tiles are electrically insulated from each other.

7. An apparatus comprising a readout plate for use with a detector that detects evidence of elementary particles passing through a gas, wherein said readout place comprises an exterior face, a first dielectric layer, and conductive strips, wherein said first dielectric layer comprises a front face that is turned toward said exterior face, wherein said exterior face is arranged to be struck by an avalanche of secondary charges, wherein said conductive strips extend parallel to said front face in at least two directions, wherein each conductive strip extends from a first end to a second end thereof, wherein said second end is configured for connection to a charge sensor, wherein said conductive strips comprise conductive tiles and electrical connections, wherein said conductive tiles are identical to each other, wherein said conductive tiles are all equidistant from said exterior face, wherein said conductive tiles are distributed over said front face of said first dielectric layer, wherein said conductive tiles are mechanically separated from each other by a dielectric, wherein for each tile, there exist rectangles, each of which entirely contains said tile, wherein, within said rectangles, each of which entirely contains said tile, there exists a smallest rectangle, wherein said smallest rectangle has an area that is smaller than areas of all other rectangles, each of which entirely contains said tile, wherein said smallest rectangle has a longer side and shortest side, wherein said shortest side has a length that is smaller than that of said longest side, wherein said length of said shortest side defines a smallest dimension of said tile, wherein said smallest dimension exceeds three hundred micrometers, wherein said electrical connections are located under said first dielectric layer, wherein said electrical connections electrically connect said conductive tiles in series to form said conductive strips, wherein said electrical connections are arranged such that each conductive tile belongs to at most a single conductive strip and such that each side of a first tile is adjacent to a side of a second tile, wherein said first and second conductive tiles belong to different conductive strips, wherein each conductive tile is a triangle, wherein said conductive tiles belong to one of a first set, a second set, and a third set, wherein said first set includes all conductive tiles that are aligned along a first direction, wherein said second set includes all conductive tiles that are aligned along a second direction, wherein said second direction is offset by sixty degrees from said first direction, wherein said third set includes all conductive tiles that are aligned along a third direction, wherein said third direction is offset from said first direction by one hundred and twenty degrees, wherein said electrical connections connect one in two conductive tiles from said first set in series, wherein, as a result, within said first set, there exist first conductive tiles and second conductive tiles, wherein said first conductive tiles consist of tiles that are connected in series by said electrical connections, wherein said second conductive tiles consist of tiles that are connected in series by said electrical connections, wherein said first and second conductive tiles are electrically insulated from each other, wherein said electrical connections connect one in two conductive tiles from said second set in series, wherein, as a result, within said second set, there exist third conductive tiles and fourth conductive tiles, wherein said third conductive tiles consist of tiles that are connected in series by said electrical connections, wherein said fourth conductive tiles consist of tiles that are connected in series by said electrical connections, wherein said third and fourth conductive tiles are electrically insulated from each other, wherein said electrical connections connect one in two conductive tiles from said third set in series, wherein, as a result, within said third set, there exist fifth conductive tiles and sixth conductive tiles, wherein said fifth conductive tiles consist of tiles that are connected in series by said electrical connections, wherein said sixth conductive tiles consist of tiles that are connected in series by said electrical connections, and wherein said fifth and sixth conductive tiles are electrically insulated from each other.

8. The apparatus of claim 6, wherein said second direction is angularly offset by ninety degrees from said first direction.

9. The apparatus of claim 4, wherein said conductive strips extend parallel to said front face in at least three different directions.

10. An apparatus comprising a readout plate for use with a detector that detects evidence of elementary particles passing through a gas, wherein said readout place comprises an exterior face, a first dielectric layer, and conductive strips, wherein said first dielectric layer comprises a front face that is turned toward said exterior face, wherein said exterior face is arranged to be struck by an avalanche of secondary charges, wherein said conductive strips extend parallel to said front face in at least two directions, wherein each conductive strip extends from a first end to a second end thereof, wherein said second end is configured for connection to a charge sensor, wherein said conductive strips comprise conductive tiles and electrical connections, wherein said conductive tiles are identical to each other, wherein said conductive tiles are all equidistant from said exterior face, wherein said conductive tiles are distributed over said front face of said first dielectric layer, wherein said conductive tiles are mechanically separated from each other by a dielectric, wherein for each tile, there exist rectangles, each of which entirely contains said tile, wherein, within said rectangles, each of which entirely contains said tile, there exists a smallest rectangle, wherein said smallest rectangle has an area that is smaller than areas of all other rectangles, each of which entirely contains said tile, wherein said smallest rectangle has a longer side and shortest side, wherein said shortest side has a length that is smaller than that of said longest side, wherein said length of said shortest side defines a smallest dimension of said tile, wherein said smallest dimension exceeds three hundred micrometers, wherein said electrical connections are located under said first dielectric layer, wherein said electrical connections electrically connect said conductive tiles in series to form said conductive strips, wherein said electrical connections are arranged such that each conductive tile belongs to at most a single conductive strip and such that each side of a first tile is adjacent to a side of a second tile, wherein said first and second conductive tiles belong to different conductive strips, said apparatus further comprising a gas chamber, an amplifier, a charge sensor, and a processing unit, all of which cooperate with said readout plate to form a gaseous particle detector, wherein said gas chamber is configured to enclose a gas that, when passed through by an elementary particle, yields a primary charge, said primary charge being carried by one of an ion and an electron, wherein said amplifier produces an avalanche of secondary charges from said primary charge, wherein said readout plate is arranged to be struck by said avalanche, wherein said processing unit is configured to determine an impact point at which said elementary particle interacted with a gas molecule in said gas based on amount of charge measured on each of said conductive strips by said charge sensor and from known positions of said strips on said readout plate, wherein said exterior face of said readout plate is arranged so as to be struck by said avalanche of secondary charges, wherein said dielectric layer has a front face turned towards said exterior face, wherein said conductive strips extend parallel to said front face in at least two different directions, wherein each conductive strip extends from a first end to a second end, wherein each conductive strip electrically connects to a corresponding input of said charge sensor.

11. The apparatus of claim 10, wherein said readout plate further comprises a resistive layer, wherein said resistive layer covers all of said conductive strips, wherein said resistive layer is configured to receive a distribution of secondary charges incident thereon as a result of an avalanche of said secondary charges and to broaden said distribution above a plurality of conductive strips, and wherein said conductive tiles are equidistant from said resistive layer.

12. The apparatus of claim 11, wherein said readout plate comprises a second dielectric layer interposed between said resistive layer and said conductive strips, wherein said second dielectric layer covers said conductive strips, wherein a stack that includes a conductive strip, said second dielectric layer, and said resistive layer forms a capacitor.

13. The apparatus of claim 10, wherein said conductive strips extend parallel to said front face in at least three different directions.

14. The apparatus of claim 5, wherein said readout plate further comprises a resistive layer, wherein said resistive layer covers all of said conductive strips, wherein said resistive layer is configured to receive a distribution of secondary charges incident thereon as a result of an avalanche of said secondary charges and to broaden said distribution above a plurality of conductive strips, and wherein said conductive tiles are equidistant from said resistive layer.

15. The apparatus of claim 14, wherein said readout plate comprises a second dielectric layer interposed between said resistive layer and said conductive strips, wherein said second dielectric layer covers said conductive strips, wherein a stack that includes a conductive strip, said second dielectric layer, and said resistive layer forms a capacitor.

16. The apparatus of claim 5, wherein said conductive strips extend parallel to said front face in at least three different directions.

17. The apparatus of claim 6, wherein said readout plate further comprises a resistive layer, wherein said resistive layer covers all of said conductive strips, wherein said resistive layer is configured to receive a distribution of secondary charges incident thereon as a result of an avalanche of said secondary charges and to broaden said distribution above a plurality of conductive strips, and wherein said conductive tiles are equidistant from said resistive layer.

18. The apparatus of claim 17, wherein said readout plate comprises a second dielectric layer interposed between said resistive layer and said conductive strips, wherein said second dielectric layer covers said conductive strips, wherein a stack that includes a conductive strip, said second dielectric layer, and said resistive layer forms a capacitor.

19. The apparatus of claim 6, wherein said conductive strips extend parallel to said front face in at least three different directions.

20. The apparatus of claim 7, wherein said readout plate further comprises a resistive layer, wherein said resistive layer covers all of said conductive strips, wherein said resistive layer is configured to receive a distribution of secondary charges incident thereon as a result of an avalanche of said secondary charges and to broaden said distribution above a plurality of conductive strips, and wherein said conductive tiles are equidistant from said resistive layer.

21. The apparatus of claim 20, wherein said readout plate comprises a second dielectric layer interposed between said resistive layer and said conductive strips, wherein said second dielectric layer covers said conductive strips, wherein a stack that includes a conductive strip, said second dielectric layer, and said resistive layer forms a capacitor.

22. The apparatus of claim 7, wherein said conductive strips extend parallel to said front face in at least three different directions.

* * * * *